(12) United States Patent
Grunert

(10) Patent No.: US 6,366,878 B1
(45) Date of Patent: Apr. 2, 2002

(54) CIRCUIT ARRANGEMENT FOR IN-CIRCUIT EMULATION OF A MICROCONTROLLER

(75) Inventor: Jens Grunert, Dresden (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/163,626

(22) Filed: Sep. 28, 1998

(30) Foreign Application Priority Data

Sep. 26, 1997 (DE) .......................................... 197 42 577

(51) Int. Cl.$^7$ ............................................. G06F 9/455
(52) U.S. Cl. ............................. 703/28; 703/24; 703/26; 703/27; 716/1
(58) Field of Search ............................. 703/23, 24, 25, 703/26, 27, 28; 716/1, 2, 3, 4

(56) References Cited

U.S. PATENT DOCUMENTS 5,313,618 A * 5/1994 Pawloski ...................... 703/28
5,331,571 A * 7/1994 Aronoff et al. ................ 716/4
6,006,022 A * 12/1999 Rhim et al. .................... 716/1

OTHER PUBLICATIONS

Jones, "Design for Test In a Custom 8–Bit Microcontroller", IEEE Colloquium on Guaranteeing the Reliability of Automotive Electronics, pp. 7/1–7/6 (1988).*

* cited by examiner

Primary Examiner—Kevin J. Teska
Assistant Examiner—Samuel Broda
(74) Attorney, Agent, or Firm—Herbert L. Lerner; Laurence A. Greenberg; Werner H. Stemer

(57) ABSTRACT

A circuit configuration allowing for in-circuit emulation, comprising a memory containing an operating program; and a first and second microcontrolller. Each microcontroller has a computer core, at least five external connection ports, and a setable connecting device selectively connecting the computer core to the connection ports. A first connection port of the first microcontroller is connected to a first connection port of the second microcontroller. The memory is connected to at least a second one of the connection ports of the first microcontroller. The connecting devices are set to provide the computer core of the first microcontroller with the operating program contained in the memory, and are set to provide data transfer between the first connection port of the first microcontroller and the first connection port of the second microcontroller.

9 Claims, 1 Drawing Sheet

CIRCUIT ARRANGEMENT FOR IN-CIRCUIT EMULATION OF A MICROCONTROLLER

BACKGROUND OF THE INVENTION

Field of the Invention

The invention relates to a circuit arrangement for in-circuit emulation of a microcontroller, and to a microcontroller for use therein.

When developing application systems with microcontrollers, it is necessary for the microcontroller to be operated in the application system itself, and for internal signals and states, which are not accessible in normal operation, to be guided outside and monitored for test purposes. In particular, there is a need to provide a possibility of access to the operating program of the microcontroller, which in normal operation is stored in an ROM memory which is not directly accessible from outside. The operating program can thereby be changed during the development phase. A service computer is used as user interface to the microcontroller. This technique is denoted as in-circuit emulation (ICE) of the microcontroller.

Production of a variant of a standard commercially manufactured microcontroller which is suitable for in-circuit emulation is problematical. To date, a bond-out version in which additional internal signals are guided outside and can thereby be tapped has been produced for this purpose. The outlay on production of the bond-out microcontroller is exceptionally high. By contrast with the standard commercially manufactured circuit, the bond-out version of the microcontroller is usually available only after substantial delay.

SUMMARY OF THE INVENTION

The object of the invention is to reduce the outlay for providing a microcontroller suitable for in-circuit emulation.

In accordance with an advantageous feature of the present invention, the operating program for in-circuit emulation is not stored in the internal ROM memory, but in an external, and therefore easily accessible memory. The connecting device can be used to operate the microcontroller in a plurality of operating modes, with the result that the same circuit design can be used both for the standard commercially manufactured product and for its emulation variant. The additional circuit outlay essentially comprises suitable changeover switches for the connecting ports of the microcontroller, and is kept within acceptable bounds.

The arrangement, according to the invention, for in-circuit emulation comprises two identical microcontrollers, which are operated as master and slave, as well as the external program memory. The slave receives the same program instructions parallel to the master. The connection ports, which are differently occupied in the master by comparison with normal operation, are handled by the slave and transmitted to the master. The operating program is processed in the master. The occupation of the external connecting port of the overall circuit comprising master, slave and external memory, corresponds to the normal operation of the standard commercially manufactured microcontroller. When the standard commercially manufactured microcontroller is present, in-circuit emulation is also already possible. It is advantageous that all design changes carried out in the standard commercially manufactured product (for example time response of connecting ports and switching edges, live currents, etc.) are also directly available in the emulator.

It is accordingly an object of the invention to provide a circuit arrangement for in-circuit emulation, comprising a first and a second identical microcontroller (2, 3), which in each case have at least five external connections (P0, ..., P4; P0', ..., P4') as well as a connecting device (9, 9'), which serves to connect the connections inside the microcontroller to one another and to the internal function units (7, 7') of the microcontroller, and has a different setting in the first and second microcontrollers (2, 3), and comprising a memory (4) for an operating program with data and address connections (D, AL, AH), the identical connections of the two microcontrollers not being connected to one another, the data and address connections (D, AH, AL) of the memory (4) being connected in each case to one of the connections (P0, P2) of the first microcontroller (2) and the data connection (D) of the memory (4) being connected to one of the connections (P1) of the second microcontroller (3), the microcontrollers being mutually connected to one another via one connection (P3, P') in each case, and the remaining connections (P1, P4; P0', P2', P3') of the microcontrollers being provided for connection to an application system, and the connecting devices (9, 9') being set in such a way that the function units (7) of the first microcontroller (2) are provided with the operating program from the memory (4), and the signal traffic at the remaining connections (P0', P2', P3') of the second microcontroller (3) being provided via the terminal (P3) for connection to the second microcontroller (3).

In accordance with an added feature of the invention, the internal function units (7, 7') of the first and second microcontrollers (2, 3) in each case have an internal address connection (ah) and an internal data connection (al/d) for calling the operating program as well as five internal connections (p0, ..., p4), wherein the internal address connection (ah) and the internal data connection (al/d) are connected to a first and a second external connection (P0, P2) inside the first microcontroller (2) via a connecting device (9) thereof in a first setting, first, second and third internal connections (p0, p2, p3) are connected to a third external connection (P3), and fourth and fifth internal connections (p4, p1) are connected to a fourth and fifth external connection (P4, P1), and wherein the internal data connection (al/d) is connected to the fifth external connection (P1') inside the second microcontroller (2) via connecting device (9') thereof in a second setting, and the first, second and third external connections (P0', P2', P3') are connected to the fourth external connection (P4').

In accordance with an additional feature of the invention, concerning the first microcontroller (2) the second external connection (P2) is connected to the address connection (AH, AL) of the external memory (4), and the first external connection (P0) is connected to the data connection (D) of the external memory (4), and wherein concerning the second microcontroller (3) the fifth external connection (P1') is connected to the data connection (D) of the external memory (4), and the fourth external connection (P4') is connected to the third external connection (P3) of the first microcontroller.

In accordance with an another feature of the invention, a clock synchronizes the two microcontrollers (2, 3).

In accordance with a further added feature of the invention, each of the external and internal connections (P0, ..., P4, P0', ..., P4', p0, ..., p4) comprises a multiplicity of individual signal lines.

In accordance with a further additional feature of the invention, the internal data connection (al/d) of the internal function units (7, 7') is constructed in order to receive or transmit data and a portion of the address of the memory (4)

in a time-division multiplexed fashion, and the internal address connection (ah) of the internal function units (7, 7') is constructed in order to transmit another portion of the address of the memory (4).

In accordance with yet another feature of the invention, there is provided in each case on the microcontrollers (2, 3) at least one further external connection (P5, P6, . . . , P5', P6', . . . ) which is connected in each case to a means for generating a constant signal level, wherein the microcontrollers (2, 3) in each case have circuit means which can be used to interrogate the signal level present during a reset operation, and wherein the signal levels at the first and second microcontrollers (2, 3) are different.

In accordance with yet another added feature of the invention, a microcontroller has internal function units (7, 7') with at least five internal connections (p0, . . . , p4), an internal program data connection (al/d) and an internal address connection (ah) for calling an operating program, and which has an internal memory (8, 8') for the operating program and a connecting device (9, 9'), by means of which in a first setting the internal address connection (ah) and the internal data connection (al/d) can be connected to a first and a second external connection (P0, P2), first, second and third internal connections (p1, p2, p3) can be connected to a third external connection (P3), and fourth and fifth internal connections (p4, p1) can be connected to a fourth and fifth external connection (P4, P1), by means of which in a second setting the internal data connection (al/d) can be connected to the fifth external connection (P1'), and the first, second and third external connection (P0', P2', P3') can be connected to the fourth external connection (P4'), and by means of which in a third setting the internal address connection (ah) and the internal data connection (al/d) can be connected to the internal memory (8, 8'), and the internal connections (p0, . . . , p4) can be connected in each case to one of the external connections (P0, . . . , P4, P0', . . . , P4').

In accordance with yet another added feature of the invention, a circuit configuration is provided including a memory containing an operating program; and a first and second microcontrolller, each the microcontroller having: a computer core, at least five external connection ports, and a setable connecting device selectively connecting the computer core to the connection ports. A first connection port of the first microcontroller is connected to a first connection port of the second microcontroller; the memory is connected to at least a second one of the connection ports of the first microcontroller; and the connecting devices are set to provide the computer core of the first microcontroller with the operating program contained in the memory; and set to provide data transfer between the first connection port of the first microcontroller and the first connection port of the second microcontroller.

In accordance with yet another added feature of the invention, a circuit configuration is provided comprising: a memory for containing an operating program; first and second microcontrollers having a respective: input/output port, internal function unit having an ALU, and connecting device connecting the internal function unit to the input/output port, the connecting device having multiple settings, and at least one further input/output port. The input/output port of the first microcontroller is connected to the input/output port of the second microcontroller. The connecting devices of the first and second microcontrollers are set to provide at least a portion of the operating program contained in the memory to the function unit of the first microcontroller, and to provide external signals applied to the at least one further input/output port of the second microcontroller to the input/output port of the first microcontroller.

Other features which are considered as characteristic for the invention are set forth in the appended claims.

Although the invention is illustrated and described herein as embodied in a circuit arrangement for in-circuit emulation of a microcontroller, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
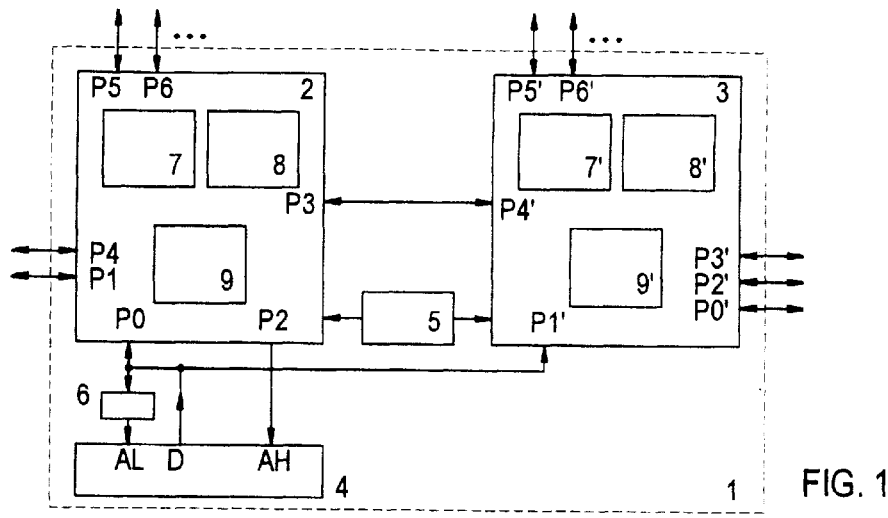
FIG. 1 shows a circuit diagram of the overall arrangement for in-circuit emulation.

The overall circuit arrangement 1, shown in FIG. 1, for in-circuit emulation includes two microcontrollers 2, 3 of identical design, and an external memory 4 in which an operating program is stored. The microcontrollers have an ROM memory 8, 8' in which the operating program is otherwise stored in normal operation. During in-circuit emulation, the memory 8, 8' is switched off. The computer core 7, 7' contains chip-internal signal and data buses CPU, ALU, etc. A connecting logic device 9, 9' ensures the connection of the connecting ports P0, . . . , P4 to one another and to the computer core 7, 7'. The microcontroller 2 is operated as master, the microcontroller 3 as slave. These different operating modes are effected by different setting of the connecting logic 9, 9' in the microcontrollers 2, 3.

The master 2 is connected to the external memory 4 by means of its ports P0, P2. Via the port P2, a signal bus with a number of (for example eight) parallel signal lines, the more significant byte of the memory address AH is fed to the memory 4. The less significant byte of the memory address AL is transmitted via the port P0. In a fashion alternating over time, that is to say a multiplex one, the port P0 also receives a data byte D from the memory 4 with the transmission of the less significant address byte. A device 6 serves to control the multiplexed memory access. The invention is also suitable for nonmultiplexed access operation, in which separate connecting ports are available for the data and the less significant address byte. The data D read out from the memory 4 are also fed to the slave 3. By contrast with the master 2, however, the port P1' is used for the slave 3. This different connection of the ports in the microcontrollers 2, 3 is effected by suitable setting of changeover switches in the connecting logic 9, 9'—as described in more detail below. Data traffic with the application circuit is handled in the master 2 via the port P1. In the slave 3, the ports P0', P2', P3' serve as external connections of the overall circuit arrangement. A signal connection between the microcontrollers 2, 3 is produced by port P3 in the master and port P4' in the slave. The respective settings of the connecting devices 9, 9' ensure that the ports P0', P2', P3' of the slave 3 are switched through to the master 2 so that all the input and output data of the function unit 7 are available in the master 2 as in normal operation. The master 2 processes the operating program by evaluating the data, input externally via the ports P0, ..., P4, from the application system. Feeding the operating program to the slave 3 serves the purpose of properly timing the control of the data input and output via the ports P0', P2', P3'. It is expedient for the microcontrollers 2, 3 to be arranged right next to one another on the printed circuit board, in order to be able to achieve as high an operating frequency as possible. A clock system 5 ensures good synchronization between master 2 and slave 3.

The emulation operation is controlled by means of a service computer connected to the circuit arrangement 1. The remaining ports P5, P6, ... of the master 2 are connected as in normal operation. The corresponding ports P5', P6', are therefore free in the slave 3, with the result that they can be used for inputting and outputting further internal signals and states, for example internal buses, control signals, register contents, etc. or for controlling the program execution. Internal states of the master 2 are transmitted to the slave 3 via the ports P3, P4', and then to the service computer via the ports P5', P6', .... The contents of the memory 4 can be changed by the service computer, in order to optimize the microcontroller in the application system during the development phase. The internal state of the master 2 can be traced by setting breakpoints. The service computer executes the application program in this case in parallel with the execution in the master 2.

Figure 2:
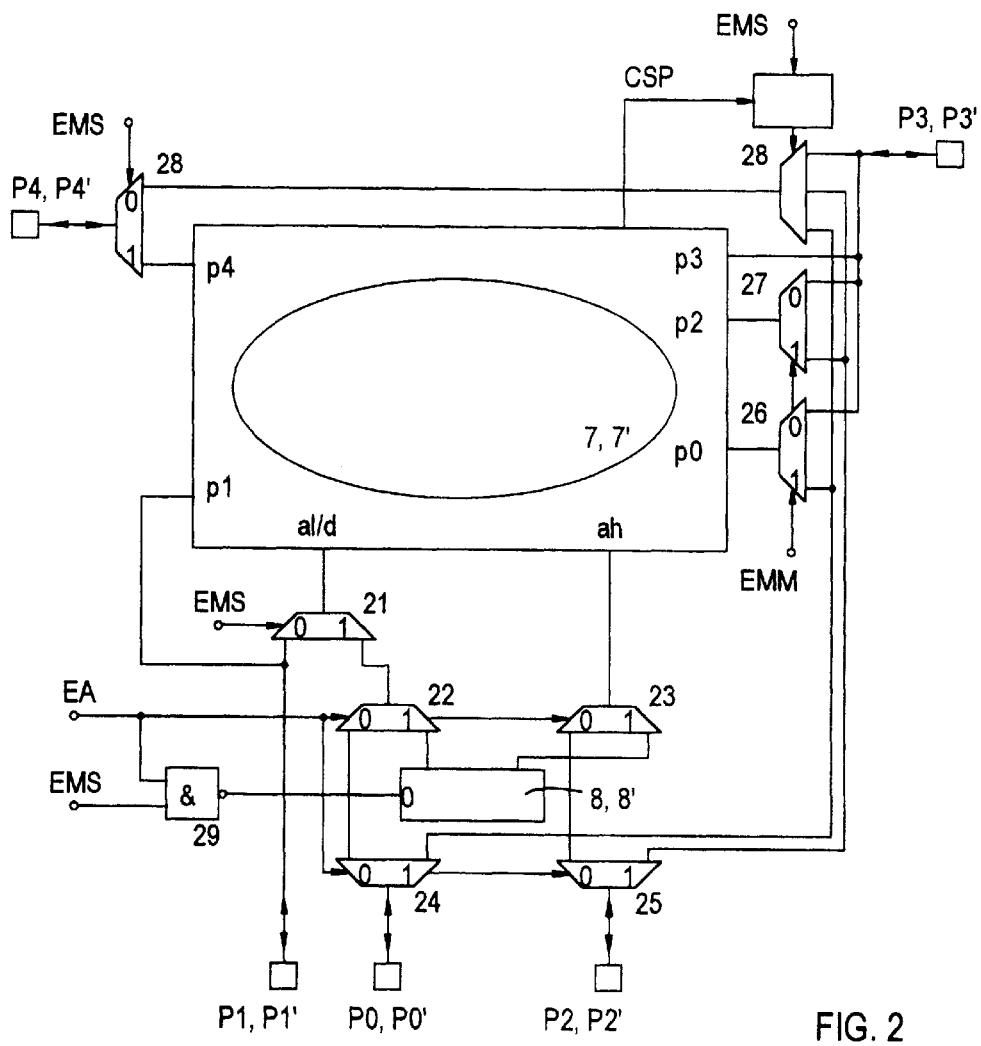
FIG. 2 shows a detailed block diagram of a microcontroller with the connecting logic additionally required for emulation.

An example of the implementation is represented in FIG. 2 for the connecting logic 9 or 9'. The computer core 7, which controls the internal functional sequence in accordance with the operating program, has internal connections p0, ..., p4 corresponding to the external connections P0, ..., P4. The interface to the program memory is carried out, as in FIG. 1, in accordance with the bus principle, operating in a multiplexed fashion. Consequently, it is necessary to provide connection ah for the more significant address byte, and a connection al/d for the less significant address byte and the data. The connecting logic is implemented essentially by the bidirectionally designed changeover switches, which surround the computer core 7, and their control. The operating mode of the connecting logic is set by the signals EA, EMM, EMS. The signal EA specifies whether addresses and data for memory access are guided via the external ports P0, P2 (EA=0), or to the internal ROM memory 8 (EA=1). The signal EMM specifies whether master operation is proceeding (EMM=0) or not (EMM=1). The signal EMS specifies whether the slave mode is proceeding (EMS=0) or not (EMS=1). The settings of the connecting logic are summarized in the following table:

| Control signal | | | |
| --- | --- | --- | --- |
| EMS | EMM | EA | Operating mode |
| 1 | 1 | 1 | Normal operation, internal ROM |
| 1 | 0 | 0 | Master operation |
| 0 | 1 | 1 | Slave operation |

In normal operation with an internal ROM program memory, addresses are output from the computer core 7 and fed to the internal ROM 8, and data are received from the internal ROM 8. In the position "1", the logic or changeover switches 21, 22, 23 ensure that the respective signal connection from the computer core 7 to the internal ROM 8 is switched through. Ports P0, P2 are switched to the connections p0, p2 of the computer core 7 via changeover switches 24, 25 in position "1" and further changeover switches 26, 27 in position "1". The external connection P1 is connected to the connection p1 of the computer core 7, and the external connection P3 is likewise connected to the internal connection p3. The external connection P4 is connected to the internal connection p4 via a multiplexer 28 in position "1".

The changeover switches are set as follows in the operating setting of the master 2. The external connection P0 is connected to the internal connection al/d via the changeover switches 24, 22 in position "0" and the changeover switch 21 in the position "1". The external connection P2 is connected to the internal connection ah via the changeover switches 25, 23 in the position "0". The external connections P0, P2 are thus configured for the connection of the external program memory 4. The internal connections P0, P2 are now, however, supplied via the external connections P0', P2' of the slave 3 by virtue of the fact that the signal traffic handled there, that is to say inputting and outputting from the slave 3, is transmitted to the external connection P3 of the master 2, and is, furthermore, connected to the internal connections p0, p2 via the changeover switches 26, 27 in the position "0". The connection of the connections P1, p1 and P4, p4 is retained as in normal operation.

The connecting logic is configured as follows in the slave operating mode. The external connection P1 is connected to the internal connection al/d via the changeover switch 21 in the position "0". The external connections P0, P2 are connected to the changeover switch 28 via the multiplexers 24, 25 in the position "1". Said changeover switch selects one of the external connections P0, P2, P3, in order to relay it to the external connection P4 via the changeover switch 28 in the position "0". The changeover switch 28 is controlled by control signals CSP output by the computer core 7. In slave operation, the internal ROM memory 8 is switched off by the signals EMS="0" and EA="1", which are combined with one another via a NAND gate 29.

For the purpose of setting the master, slave or normal operation, a constant potential (for example frame or the positive supply potential) is applied in each case to signal connecting pins, which in normal operation serve only to output signals. Different potential combinations are used to characterize the operating modes. The microprocessors have circuit means which are used during resetting of the microprocessors at the start of operation to interrogate under program control the potential present at a signal pin. Subsequently, the connecting logic is set to a setting for master or slave or normal operation in accordance with the potential determined.

I claim:

1. A circuit arrangement for in-circuit emulation, comprising:

a first and a second identical microcontroller which in each case have at least five external connections as well as a connecting device that serves to connect the connections inside the first and the second microcontroller to one another and to the internal function units of the first and the second microcontroller, and has a different setting in the first and second microcontrollers, and comprising a memory for an operating program with data and address connections, the identical connections of the two microcontrollers not being connected to one another, the data and address connections of the memory being connected in each case to one of the connections of the first microcontroller and the data connection of the memory being connected to one of the connections of the second microcontroller, the microcontrollers being mutually connected to one another via one connection in each case, and the remaining connections of the microcontrollers being connected to an application system, and the connecting devices providing the function units of the first microcontroller with the operating program from the memory, and the signal traffic at the remaining connections of the second microcontroller being connected via a terminal to the second microcontroller.

2. The circuit arrangement according to claim 1, wherein the internal function units of the first and second microcontrollers each have an internal address connection and an internal data connection for calling the operation program as well as five internal connections; the internal address connection and the internal data connection are connected to a first and a second external connection inside the first setting;

first, second and third internal connections are connected to a third external connection, and fourth and fifth internal connections are connected to a fourth and fifth external connection, and the internal data connection is connected to the fifth external connection inside the second microcontroller via connecting device thereof in a second setting; and the first, second and third external connections are connnected to the fourth external connection.

3. The circuit arrangement according to claim 1, wherein:

the second external connection of the first microcontroller is connected to an address connection of the external memory;

a first external connection of the first microcontroller is connected to a data connection of the external memory;

the fifth external connection of the second microcontroller is connected to the data connection of the external memory; and the fourth external connection of the second microcontroller is connected to the third external connection of the first microcontroller.

4. The circuit according to claim 1, including a clock synchronizing the first and second microcontrollers.

5. The circuit arrangement according to claim 1, wherein each of the external connections and the data and address connections include a multiplicity of individual signal lines.

6. The circuit arrangement according to claim 5, wherein the internal data connection of the internal function units is constructed in order to receive or transmit data and a portion of the address of the memory in a time-division multiplexed fashion; and the internal address connection of the internal function units is constructed in order to transmit another portion of the address of the memory.

7. The circuit arrangement according to claim 6, wherein each one of the microcontrollers includes at least one further external connection which is connected in each case to a means for generating a constant signal level; the microcontrollers in each case have a circuit for interrogating the signal level present during a reset operation; and wherein the signal levels at the first and second microcontrollers are different.

8. A circuit configuration for in-circuit emulation, comprising:

a memory containing an operating program; and a first and second microcontrolller, each said microcontroller having:
a computer core,
at least five external connection ports, and
a setable connecting device selectively connecting said computer core to said connection ports;

a first connection port of said first microcontroller connected to a first connection port of said second microcontroller;

said memory connected to at least a second one of said connection ports of said first microcontroller;

said connecting devices providing said computer core of said first microcontroller with the operating program contained in said memory; and providing data transfer between said first connection port of said first microcontroller and said first connection port of said second microcontroller.

9. A circuit configuration for in-circuit emulation, comprising:

a memory for containing an operating program;

first and second microcontrollers having a respective:
input/output port,
internal function unit having an ALU, and
connecting device connecting said internal function unit to said input/output port, said connecting device having multiple settings,
at least one further input/output port;

said input/output port of said first microcontroller connected to said input/output port of said second microcontroller;

said connecting devices of said first and second microcontrollers providing at least a portion of the operating program contained in said memory to said function unit of said first microcontroller, and providing external signals applied to said at least one further input/output port of said second microcontroller to said input/output port of said first microcontroller.

* * * * *